United States Patent [19]

Kawamura

[11] Patent Number: 5,757,354
[45] Date of Patent: May 26, 1998

[54] PORTABLE DATA COMMUNICATION APPARATUS WITH ROTATABLE DISPLAY IMAGES FOR ACCOMODATING A WIRELESS REMOTE KEYBOARD

[75] Inventor: Hiroshi Kawamura, Kanagawa, Japan

[73] Assignee: Sony Corporation, Tokyo, Japan

[21] Appl. No.: 547,488

[22] Filed: Oct. 24, 1995

[30] Foreign Application Priority Data

Oct. 31, 1994 [JP] Japan ................... 6-267668

[51] Int. Cl.$^6$ ................... G06F 1/00
[52] U.S. Cl. ................... 345/126; 345/905
[58] Field of Search ................... 345/126, 169, 345/2, 463, 455, 905; 395/137; 359/142, 154; 455/90; 348/12–13, 211, 583; 463/39

[56] References Cited

U.S. PATENT DOCUMENTS

| | | | |
|---|---|---|---|
| 4,837,845 | 6/1989 | Pruett et al. | 345/126 |
| 5,134,390 | 7/1992 | Kishimoto et al. | 345/126 |
| 5,189,543 | 2/1993 | Lin et al. | 359/142 |
| 5,241,659 | 8/1993 | Parulski et al. | 395/508 |
| 5,307,297 | 4/1994 | Iguchi et al. | 345/169 |
| 5,368,309 | 11/1994 | Monroe et al. | 345/7 |
| 5,475,803 | 12/1995 | Stearns et al. | 395/137 |
| 5,488,496 | 1/1996 | Pine | 359/83 |
| 5,533,185 | 7/1996 | Lentz et al. | 345/126 |
| 5,543,925 | 8/1996 | Timmermans | 358/451 |
| 5,605,505 | 2/1997 | Han | 463/39 |
| 5,606,594 | 2/1997 | Register et al. | 455/90 |

*Primary Examiner*—Mark R. Powell
*Attorney, Agent, or Firm*—Jay H. Maioli

[57] ABSTRACT

A portable data communication apparatus of simple arrangement can use a wireless keyboard includes a data processor, a display for displaying data processed by the data processor, a display controller for controlling the display such that it displays the data in a first orientation or in a second orientation different from the first orientation, a data receiver, and a reception controller for supplying data received at the data receiver to the data processor, wherein the display controller controls the display such that, when the data receiver is set in a first mode available for receiving data transmitted thereto from an external input, the display displays data in the first orientation and that, when the data receiver is not set in the first mode, the display displays data in the second orientation.

7 Claims, 8 Drawing Sheets

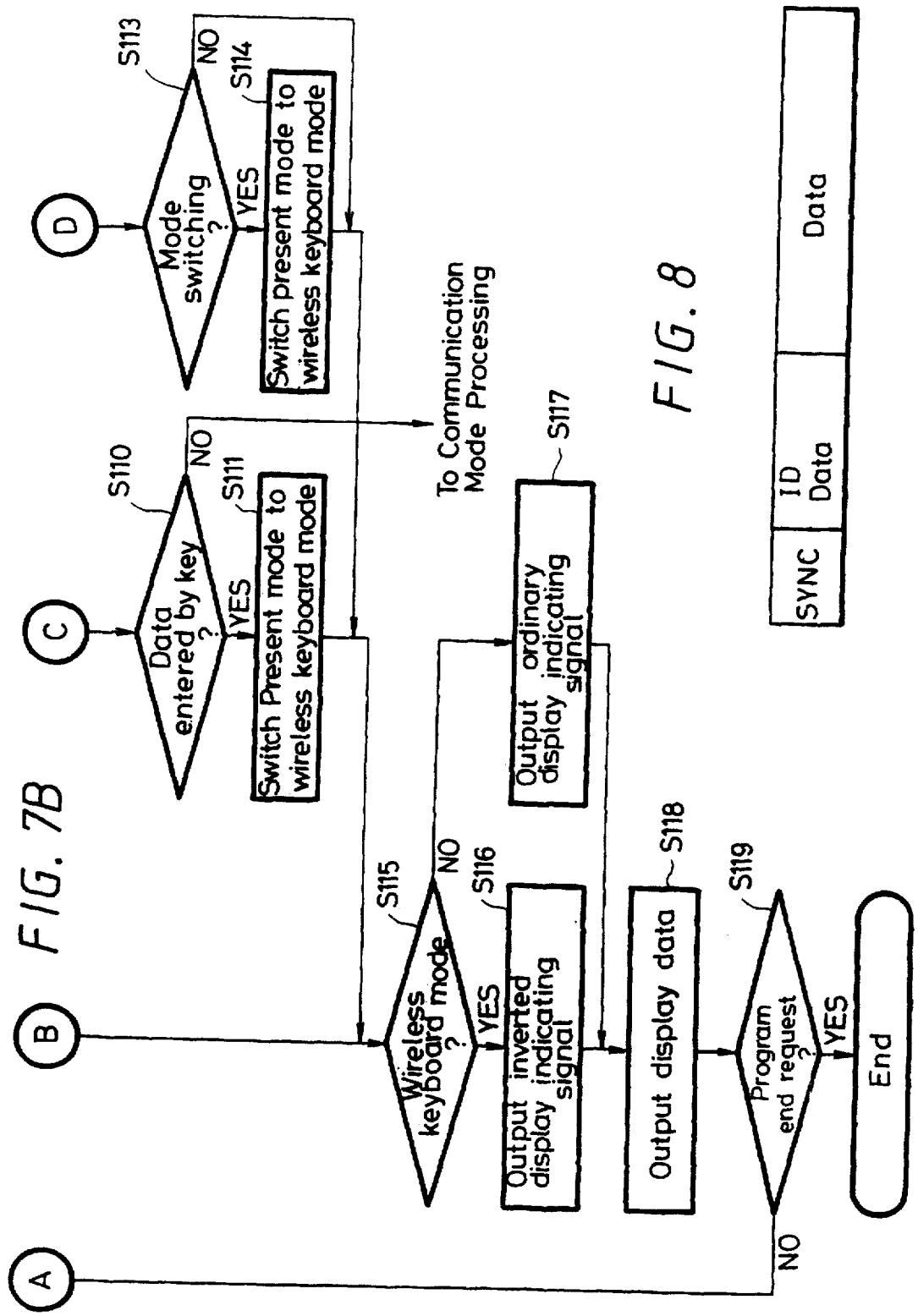

PORTABLE DATA COMMUNICATION APPARATUS WITH ROTATABLE DISPLAY IMAGES FOR ACCOMODATING A WIRELESS REMOTE KEYBOARD

BACKGROUND OF THE INVENTION

The present invention relates to a portable data communication apparatus applicable to a display portion of a small personal data processing terminal device which is often referred to as a PDA (personal digital assistant).

A variety of small portable personal data processing terminal devices called PDA are now commercially available on the market.

FIG. 1 of the accompanying drawings shows an example of this kind of portable data communication apparatus. A portable data communication apparatus, generally depicted at reference numeral 1 in FIG. 1, includes a relatively large display panel 2 to display processed data thereon in the form of characters and numerals. The display panel 2 serves also as a touch panel so that the user can input a variety of data by touching the surface of the display panel 2 with a suitable means such as a pen. The portable data communication apparatus 1 includes keys 3 so that the user can input data by using the keys 3. Further, the portable data communication apparatus 1 has provided on its upper portion provided an infrared signal emitting portion 4 and an infrared signal receiving portion 5 for communicating with other portable data communication apparatus.

The portable data communication apparatus 1 includes a data input and output terminal 6 to which there can be connected a variety of external devices. FIG. 1 shows a manner in which a keyboard 40 is connected to the portable data communication apparatus 1 as an external device. Specifically, the keyboard 40 comprises keys 41 for directly entering a variety of data such as characters and numerals, a signal cable 42 and a connector 43 formed at the tip end of the signal cable 42. Therefore, when the user connects the connector 43 to the data input and output terminal 6 of the portable data communication apparatus 1, the user can use the keyboard 40 as a data input keyboard of the portable data communication apparatus 1. Thus, the user becomes able to enter data more quickly as compared with the case that the user enters data by use of the touch panel 2.

FIG. 2 shows a manner in which the portable data communication apparatus 1 communicates with other portable data communication apparatus by use of the infrared signal emitting portion 4 and the infrared signal receiving portion 5. Two portable data communication apparatus 1 of the same arrangement are prepared and placed such that upper portions of the two portable data communication apparatus 1 are opposed to each other as shown in FIG. 2. The infrared signal emitting portions 4 and the infrared signal receiving portions 5 of the two portable data communication apparatus 1 are placed close to each other. Thus, it becomes possible to transmit infrared signals between the two portable data communication apparatus 1 in a two-way fashion. As a consequence, data stored in one portable data communication apparatus can be transmitted to the other portable data communication apparatus via the infrared signal, thereby enabling the portable data communication to be used in a wider application field.

It is customary that the infrared signal emitting portion 4 and the infrared signal receiving portion 5 of this kind of the portable data communication apparatus 1 are disposed on the upper side of the display panel 2 so as to make the portable data communication apparatus become easier to handle. When in use, the two portable data communication apparatus 1 are opposed to each other to transmit data as shown in FIG. 2. If the infrared signal emitting portion 4 and the infrared signal receiving portion 5 are disposed at other positions (e.g., lower side of the display panel 2), then the portable data communication apparatus 1 becomes difficult to handle when data is transmitted. Therefore, in most of the portable data communication apparatus of this kind, the infrared signal emitting portion and the infrared signal receiving portion are disposed on the upper side of the display panel.

It is cumbersome for the user to connect the keyboard 40 to the portable data communication apparatus 1 via the signal cable 42. In addition, the signal cable 42 frequently disturbs the user when the user operates the portable data communication apparatus 1. To obviate the aforesaid defects, a wireless keyboard is proposed as shown in FIG. 3. A wireless keyboard, generally depicted at reference numeral 50 in FIG. 3, includes a variety of keys 51 and an infrared signal emitting portion 52 which outputs an operation signal of an infrared signal on the basis of the operated one of the keys 51. A portable data communication apparatus 1' includes an infrared signal receiving portion 7 disposed on the lower side thereof for receiving an infrared signal emitted from the infrared signal emitting portion 52 of the wireless keyboard 50.

Therefore, the infrared signal output from the keyboard 50 side is received at the infrared signal receiving portion 7, whereby the user can input data to the portable data communication apparatus 1' by use of the wireless keyboard 50.

However, since the portable data communication apparatus 1' is provided with the two infrared signal receiving portions 5, 7, the portable data communication apparatus 1 becomes complicated in arrangement. Specifically, if the portable data communication apparatus 1 receives the infrared signal transmitted from the keyboard 50 at the infrared signal receiving portion 5 disposed on the upper side thereof, then the portable data communication apparatus needs only one infrared signal receiving portion and the wireless keyboard can be used by the simple arrangement. However, the keyboard could not be operated if it were not disposed on the lower side of the portable data communication apparatus 1. Therefore, it is unreasonable that the infrared signal receiving portion 5 disposed on the upper side of the portable data communication apparatus 1 is used as the light-receiving portion for the wireless keyboard. Furthermore, it is impossible to dispose the infrared signal emitting portion 4 and the infrared signal receiving portion 5, which communicate with other portable data communication apparatus, at positions other than the upper side of the portable data communication apparatus. If the infrared signal emitting portion 4 and the infrared signal receiving portion 5 are disposed at other positions than the upper position, then communication between the two portable data communication apparatus cannot be made under the condition that the upper portions of the two portable data communication apparatus are closely opposed to each other as shown in FIG. 2. In this case, the portable data communication apparatus has to be operated in a manner different from those of PDAs upon communication. As a result, the portable data communication apparatus becomes difficult to handle.

SUMMARY OF THE INVENTION

In view of the aforesaid aspect, it is an object of the present invention to provide a portable data communication apparatus of a simple arrangement in which a wireless keyboard can be used.

3

According to a first aspect of the present invention, there is provided a portable data communication apparatus which comprises a data processing means, a display control means for controlling display of data processed by the data processing means, a display for displaying the data under control of the display control means, a data receiving means and a reception control means for supplying data received at the data receiving means to the data processing means, wherein the display control means controls the display such that, when the data receiving means is available for receiving data, the display displays data in a first orientation and that, when the data receiving means is unavailable for receiving data, the display displays data in a second orientation different from the first orientation.

According to a second aspect of the present invention, there is provided a portable data communication apparatus which comprises a data processing means, a display for displaying data processed by the data processing means, a display control means for controlling the display such that the display displays the data in a first orientation or a second orientation different from the first orientation, a data receiving means, a reception control means for supplying the data received at the data receiving means to the data processing means, wherein when the reception control means is set in a first mode in which a reception of data in the data receiving means is available, the display control means controls the display such that the display displays the data in the first orientation.

According to a third aspect of the present invention, there is provided a data communication system which comprises a portable data communication apparatus composed of data processing means, a display for displaying data processed by the data processing mean, a display control means for controlling the display such that the display displays the data in a first orientation or a second orientation different from the first orientation, a data receiving means, and a reception control means for supplying data received at the data receiving means to the data processing means and an external input device, wherein the display control means controls the display such that, when the data receiving means is available for receiving a signal from the external input device, the display control means controls the display such that the display displays the data in the first orientation and that, when the data receiving means is unavailable for receiving a signal from the external input device, the display displays the data in the second orientation.

In accordance with a fourth aspect of the present invention, there is provided a data communication method which comprises the steps of receiving data supplied from external input means by data receiving means, supplying the data received at the data receiving means to data processing means by reception control means, processing the data by the data processing means and supplying the processed data to display control means and controlling a display by the display control means such that the display displays the data in a first orientation, wherein except when the data receiving means receives the data supplied thereto from an external input means, the display control means controls the display such that the display displays data in a second orientation different from the first orientation.

4

Figure 3:
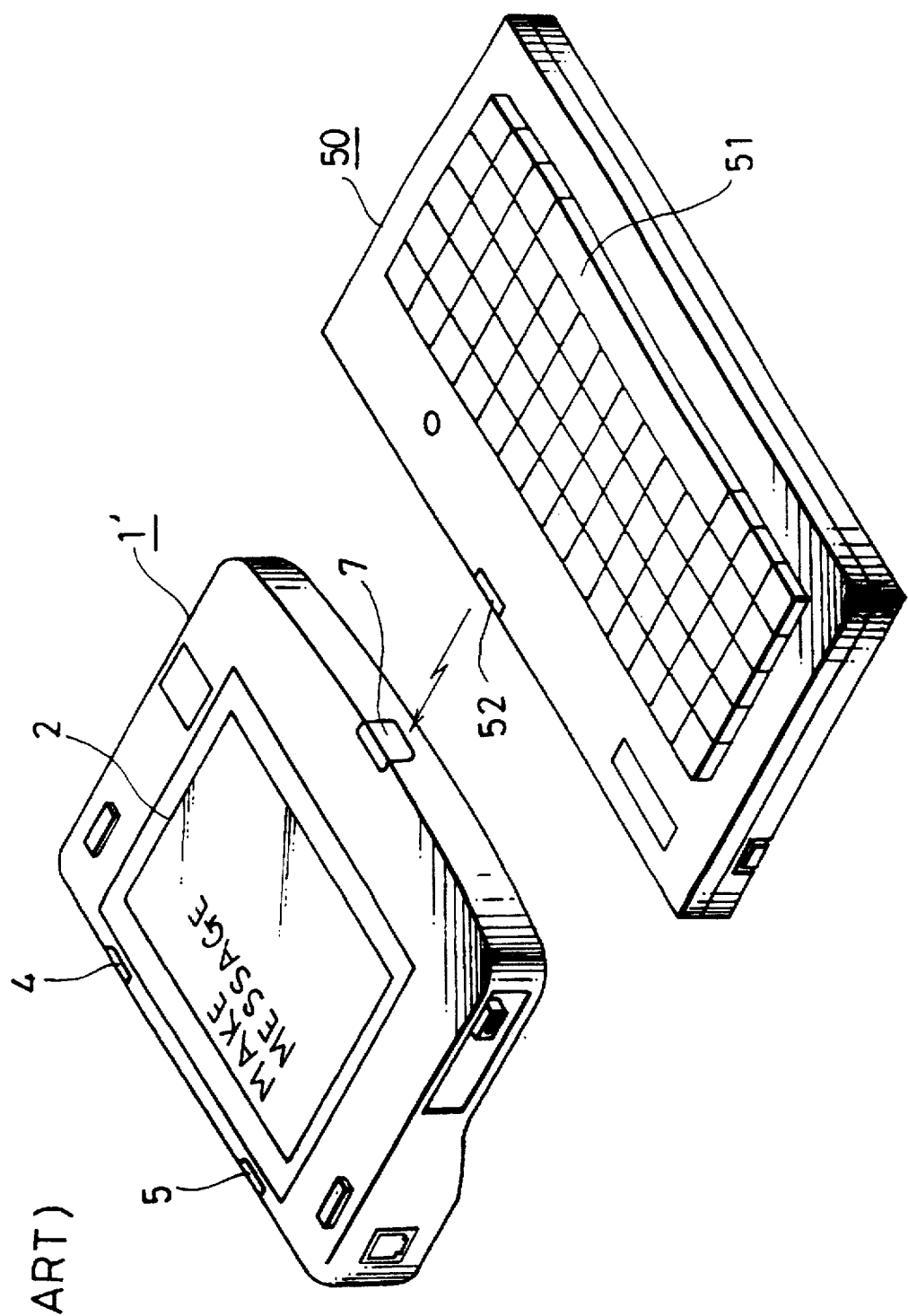
Figure 4:
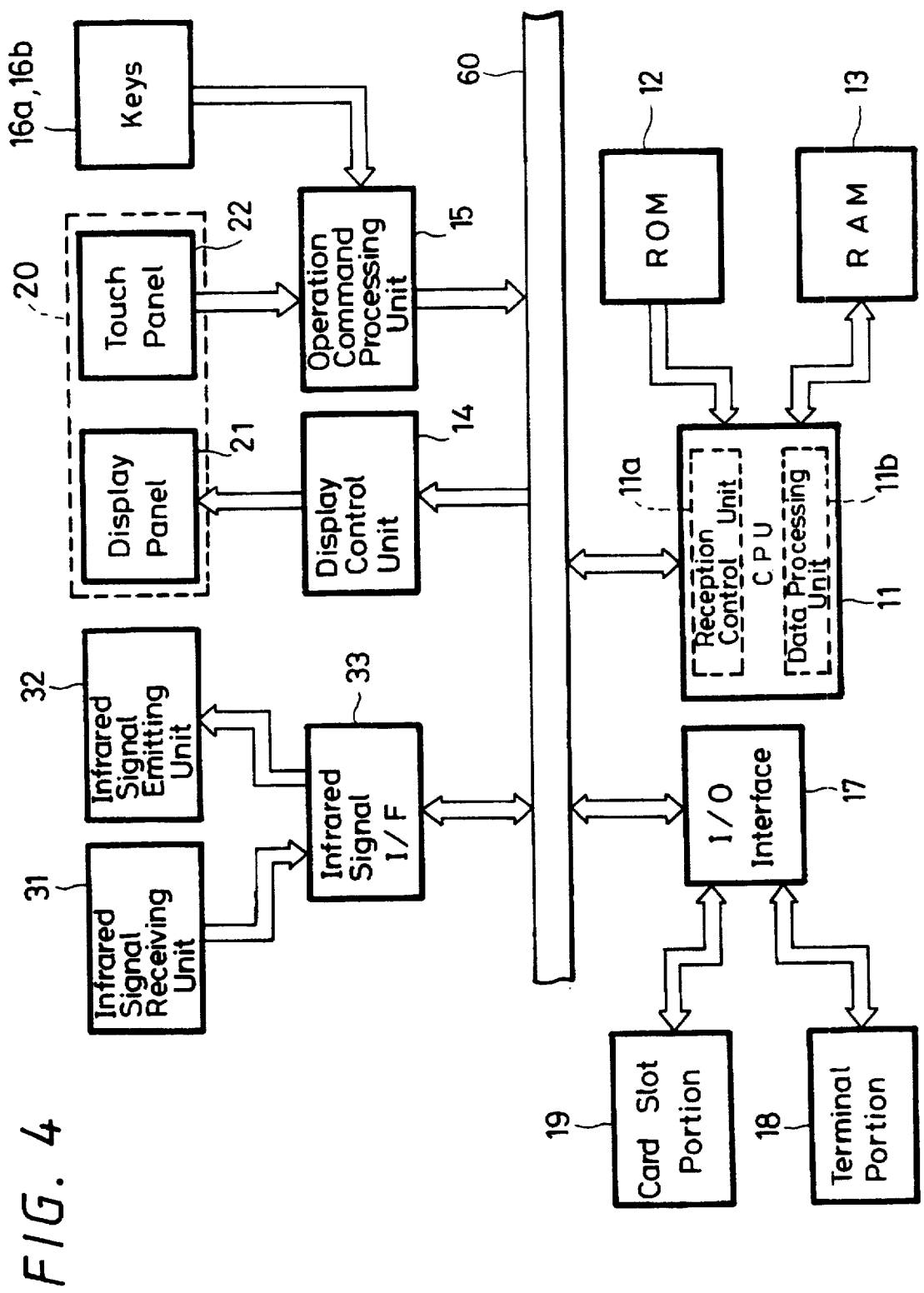
Figure 5:
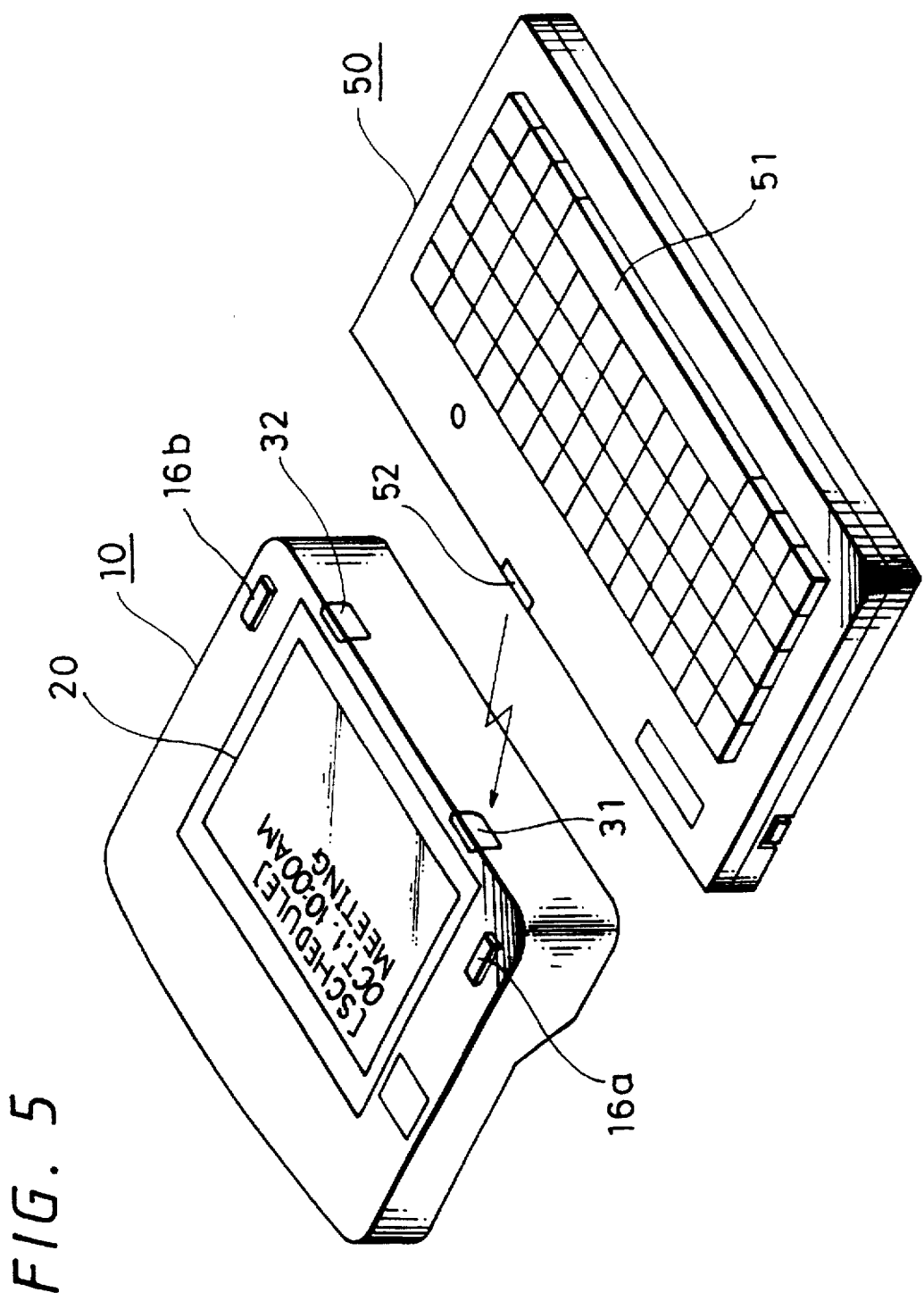
Figure 6:
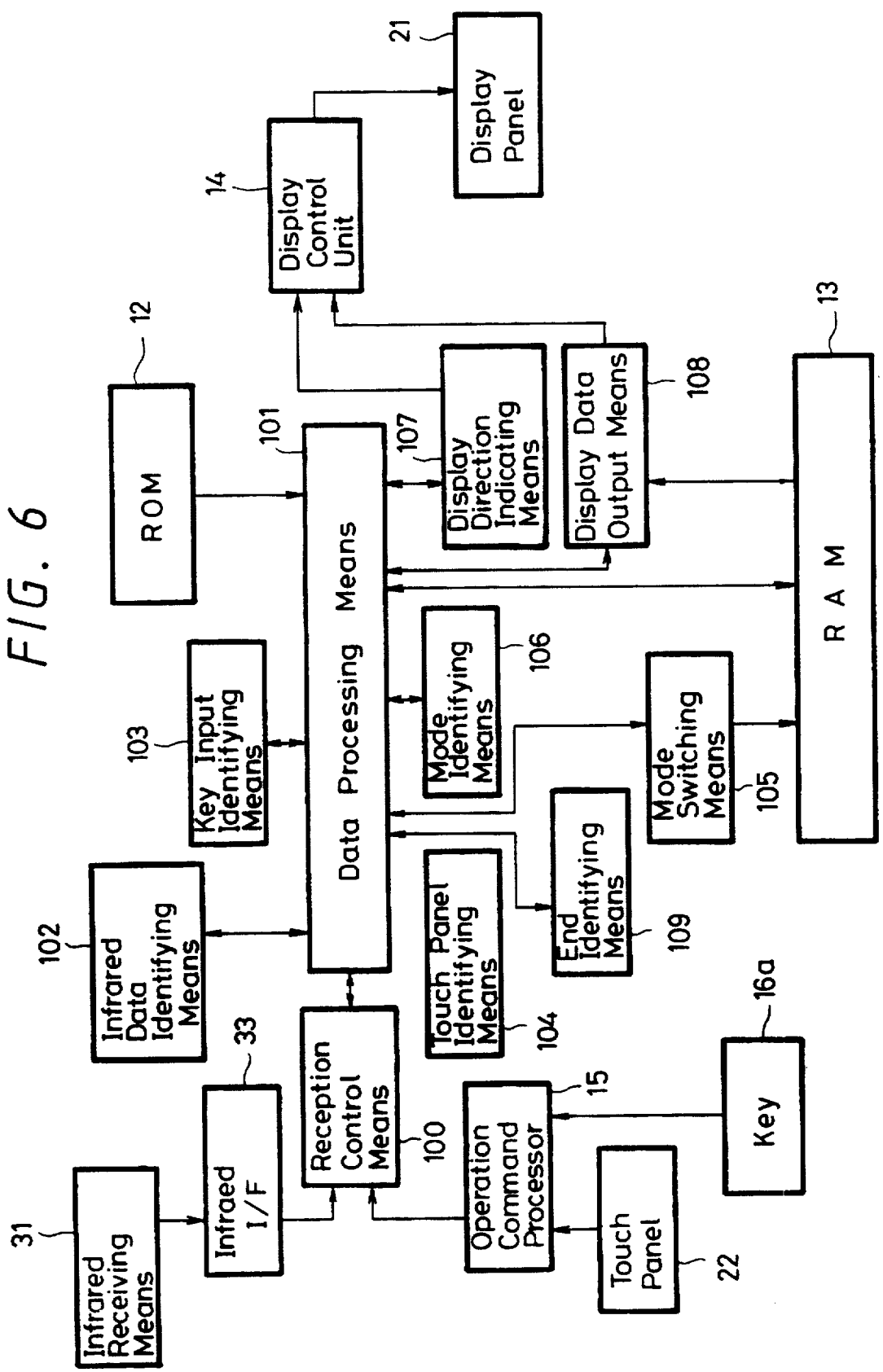
Figure 7A:
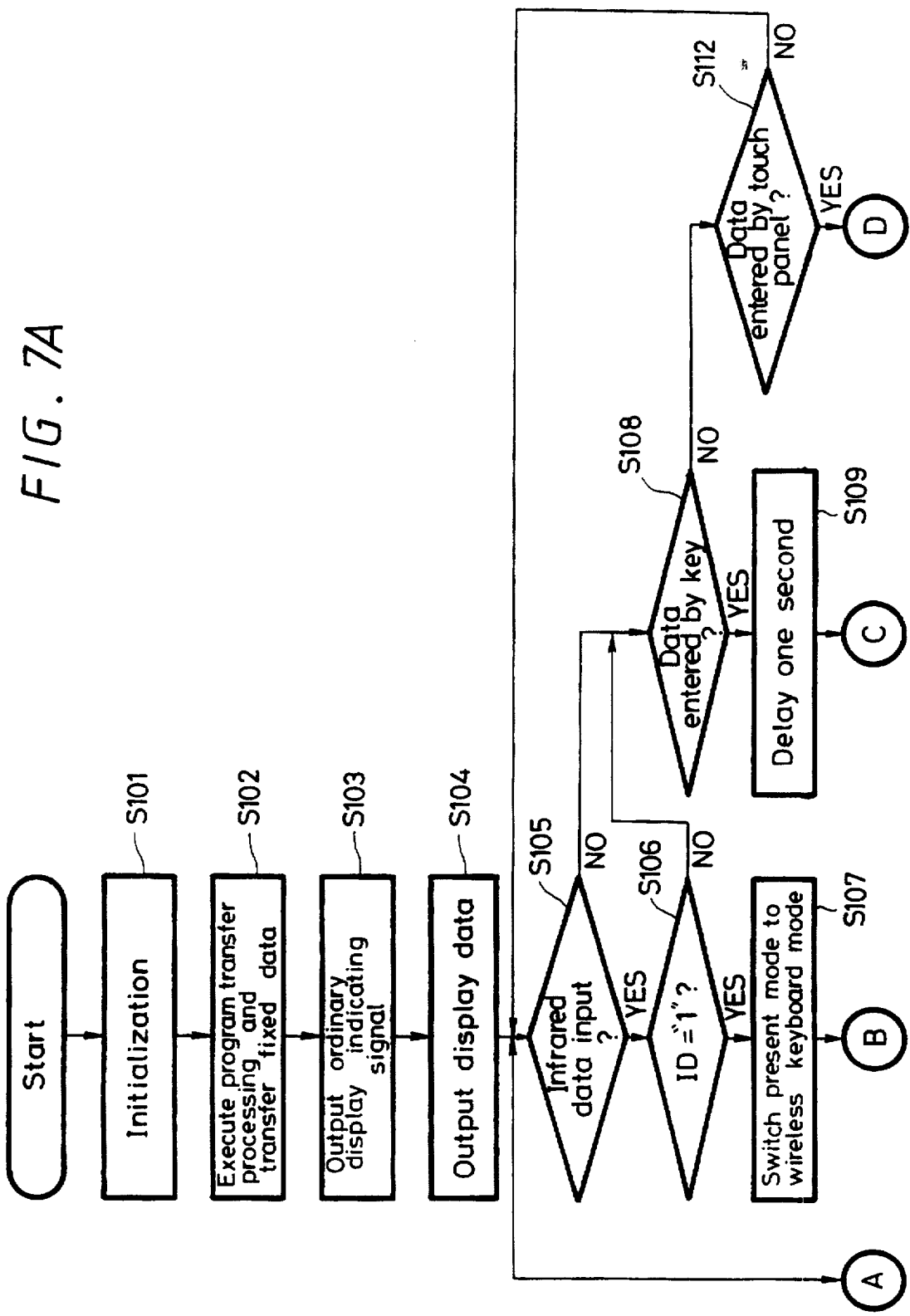

FIG. 3 is a perspective view illustrating a manner in which the portable data communication apparatus is operated by a wireless keyboard;

FIG. 4 is a block diagram showing a portable data communication apparatus according to the present invention;

FIG. 5 is a perspective view illustrating a manner in which the portable data communication apparatus according to the present invention is in use;

FIG. 6 is a functional block diagram showing operation of a reception control means and a data processing means;

FIG. 7 (formed of FIGS. 7A and 7B so as to permit the use of a suitably large scale) is a flowchart to which reference will be made in explaining operation of the reception control means and the data processing means; and FIG. 8 is a diagram used to explain a format of infrared data output from an infrared signal interface (infrared signal I/F).

DETAILED DESCRIPTION OF THE PREFERRED EMBODIMENT

A portable data communication apparatus according to an embodiment of the present invention will hereinafter be described with reference to FIGS. 4 through 8.

According to the present invention, the portable data communication apparatus is applied to a small portable personal data processing terminal device which is referred to as a "PDA".

FIG. 4 shows in block form the portable data communication apparatus according to the present invention.

As shown in FIG. 4, a central control unit 11 comprises a reception control unit 11a and a data processing unit 11b and controls data processing in respective units. The central control unit 11 might be formed of a central processing unit (CPU) and is connected with a read-only memory (ROM) 12 with program data or the like stored therein and a random-access memory (RAM) 13 with data input thereto from the outside stored therein. The reception control unit 11a disposed within the CPU 11 sets various operation modes of this portable data communication apparatus. The portable data communication apparatus provides a wireless keyboard mode and a communication mode as its operation modes.

A display control unit 14 and an operation command processing unit 15 are connected through a bus line 60 to the CPU 11. The display control unit 14 converts data supplied thereto from the data processing unit 11b disposed within the CPU 11 into display data (e.g., bit map data, etc.). The display control unit 14 drives a liquid-crystal display panel 21 forming a display unit 20 on the basis of display data so that the liquid-crystal display panel 21 displays display data in the form of character data and graphics data. If the reception control unit 11a disposed within the CPU 11 sets the wireless keyboard mode, then the liquid-crystal display panel 21 displays character data and graphics data in the inverted state of the display state (this display state will hereinafter be referred to as the "normal display state") of the other mode under control of the display control unit 14. The inverted display can be carried out by making display coordinates of display data opposite to those of the normal display state.

A touch panel 22 is formed on the surface of the liquid-crystal display panel 21. The user can operate the portable data communication apparatus variously by touching displayed menus on the touch panel 22 with an exclusively-devised input pen or the like. Operation information entered from the touch panel 22 is identified by an operation command processing unit 15 and thereby converted into operation data which is transmitted through a bus line 60 to the CPU 11. Operation information entered from two keys 16a, 16b of this apparatus also is identified by the operation command processing unit 15 and thereby converted into operation data which is then transmitted to the CPU 11.

A terminal portion 18 and a card-slot portion 19 are connected through an input and output interface (I/O interface) 17 to the bus line 60 connected to the CPU 11. If a connector of various external devices is connected to the terminal portion 18, then the portable data communication apparatus can transmit and receive data between it and other external devices connected thereto. If a data processing card such as a memory card is inserted into the card-slot portion 19, then data processed within the data processing card can be read out to the CPU 11 side or data can be transmitted from the CPU 11 side to the data processing card.

An infrared signal receiving unit 31 and an infrared signal emitting unit 32 are connected through an infrared signal interface (infrared signal I/F) 33 to the bus line 60 connected to the CPU 11. An infrared signal received (sensed) by the infrared signal receiving unit 31 is converted into control data by the infrared signal I/F 33 and then transmitted to the CPU 11. Also, control data output from the CPU 11 is converted into infrared data by the infrared signal I/F 33 and then output from the infrared signal emitting unit 32 as an infrared signal.

When the wireless keyboard mode is set by the reception control unit 11a of the CPU 11, the infrared signal received at the infrared signal receiving unit 31 is converted by the infrared signal I/F 33 as keyboard operation data and then transmitted to the reception control unit 11a of the CPU 11. Therefore, when the wireless keyboard mode is set by the reception control unit 11a, data such as character data can be input to the portable data communication apparatus by the infrared signal transmitted from the wireless keyboard and data such as input characters can be displayed on the liquid-crystal display panel 21.

When the communication mode is set by the reception control unit 11a, the infrared signal received at the infrared signal receiving unit 31 is stored in the RAM 13 connected to the CPU 11 as received data. Concurrently therewith, if data to be transmitted is stored in the RAM 13, then such data is supplied through the infrared signal I/F 33 to the infrared signal emitting portion 32, from which it is output as an infrared signal.

The respective units of the portable data communication apparatus according to the present invention are arranged similarly to the conventional portable data communication apparatus. As shown in FIG. 5, the display unit 20 composed of the liquid-crystal display panel 21 is disposed at the center of the surface of the portable data communication apparatus. The infrared signal receiving unit 31 and the infrared signal emitting unit 32 are disposed on the upper side of the display unit 20. FIG. 5 shows a manner in which data such as characters and numerals are displayed on the display portion 20 in the inverted state, that is, the displayed characters and numerals are rotated by 180° from the conventional or ordinary orientation shown in FIG. 2. In FIG. 5, reference numeral 10 generally designates a portable data communication apparatus. Data such as character data or graphics data are displayed on the liquid-crystal display panel 21 forming the display unit 20 in the inverted form.

An operation in which character data and graphics data are displayed on the display panel 21 of the apparatus (reception control and data processing operation) will be described with reference to a functional block diagram of FIG. 6 and a flowchart of FIG. 7 (formed of FIGS. 7A and 7B so as to permit the use of a suitably large scale).

As shown in FIG. 7, following the start of operation, at step S101, the portable data communication apparatus is initialized (reset) at the same time when the power switch of the apparatus is turned on, e.g., system and memory of the portable data communication apparatus are checked and set up of the portable data communication apparatus is carried out.

In the next step S102, a reception control means 100 and a data processing means 101 (reception control program and data processing program shown in FIG. 6) are read out from the ROM 12 and written in an operation RAM (random-access memory) (not shown). Concurrently therewith, a work area for temporarily saving data generated during the reception control program and the data processing program are operated and receiving and transmitting parameters among respective routines forming the reception control program and the data processing program are allocated to the operation RAM. Further, in step S102, an operation mode storage region with identification (ID) data of operation modes stored therein is allocated in the RAM 13.

In step S102, in addition to the program transfer processing, various fixed data are read out from the ROM 12 and stored in predetermined storage regions of the RAM 13. At that time, at least initialization mode identification data concerning the operation modes registered in the ROM 12 is stored in the operation mode storage region of the RAM 13.

The initialization mode is determined depending on the specification of the portable data communication apparatus. According to the present invention, the initialization mode is set to a mode using the touch panel 22 which will be simplify referred to as "touch panel mode". Accordingly, identification data indicative of the touch panel mode is stored in the above operation mode storage region of the RAM 13. In this case, if the operator does not operate the key 16a, the portable data communication apparatus is automatically placed in the touch panel mode.

Although not described in detail, the reception control means (program) 100 executes a process for converting a communication signal supplied thereto from a data receiving means such as the infrared signal I/F 33 and an operation command processing unit 15 into data of a data format that the data processing means 101, which will be described later on, can handle. For example, the reception control means 100 converts the communication signal into a data of data format (infrared data) to which ID data indicating a portion from which data is transmitted and necessary data are added as shown in FIG. 8. As shown in FIG. 6, the data processing means (program) 101 comprises an infrared data identifying means 102 for determining whether or not infrared data is input through an infrared signal I/F 33 and identifying an attribute of input infrared data, a key identifying means 103 for determining whether or not data is entered by the key 16a, a touch panel identifying means 104 for determining whether or not data is entered by the touch panel 22 and determining whether or not the data entered by the touch panel 22 indicates the mode switching, a mode switching means 105 for switching the mode into a mode using the wireless keyboard (hereinafter simply referred to as the "wireless keyboard mode") by storing identification data indicative of the wireless keyboard mode, a mode identifying means 106 for determining on the basis of identification data stored in the operation mode storage region whether the present mode is the wireless keyboard mode or the touch panel mode, a display direction indicating means 107 for outputting an inverted display indicating signal or ordinary display indicating signal to the control unit 14 on the basis of identified result supplied thereto from the mode identifying means 106, a display data output means 108 for outputting predetermined display data to the display control unit 14, and an end identifying means 109 for identifying the end of this data processing means 101.

In the data processing program 101, in step S103 shown in FIG. 7, the display direction indicating means 107 outputs the ordinary display indicating signal to the display control unit 14. In the next step S104, the display direction indicating means 107 outputs display data to the display control unit 14.

The display control unit 14 converts data for changing the following display data to the ordinary display data on the basis of the ordinary display indicating signal supplied thereto from the data processing means 101 and outputs resultant data on the display panel 21 connected to the rear stage of the display control unit 14. The display panel 21 displays data output from the display control unit 14 on the picture screen. At that very moment, display data displayed on the picture screen of the display panel 21 is in the form of ordinary display data, such as that shown in FIG. 2 for example.

It is determined in the next decision step S105 by the infrared data identifying means 102 whether or not infrared data is input through the infrared signal I/F 33. In the portable data communication apparatus, when the infrared signal receiving unit 31 receives infrared rays, the infrared signal receiving unit 31 converts the received infrared rays into a signal (infrared signal) of level corresponding to the amount (intensity) of received infrared rays. The infrared signal I/F 33 converts the infrared signal supplied thereto from the infrared signal receiving unit 31 into digital infrared data by sampling the infrared signal at a predetermined sampling frequency, for example. The infrared data from the infrared signal I/F 33 is supplied through the bus line 60 to the CPU 11 (see FIG. 4).

If the infrared data is input through the infrared signal I/F 33 from the reception control means 100 as represented by a YES at decision step S105, then the processing proceeds to the next decision step S106, whereat an attribute of the input infrared data is identified by the infrared data identifying means 102. Specifically, as shown in FIG. 8, the infrared data is composed of a synchronizing (sync) signal SYNC added to the starting portion thereof, ID (identification) data for indicating the type of infrared data and data added thereto if necessary.

Accordingly, when the attribute of the infrared data is identified by the infrared data identifying means 102 at decision step S106, the ID data contained in the infrared data is read out. Then, it is determined by the infrared data identifying means 102 whether or not the content of the ID data thus read out indicates data indicative of the wireless keyboard mode, e.g., "1".

If the content of the ID data is "1"as represented by a YES at decision step S106, then the processing proceeds to the next step S107, whereat the mode switching means 105 switches the present mode to the wireless keyboard mode by storing the ID data indicative of the wireless keyboard mode in the operation mode storage region of the RAM 13.

If on the other hand the infrared data is not input as represented by a NO at decision step S105 or if the ID data of the infrared data is not "1" indicative of the wireless keyboard mode as represented by a NO at decision step S106, then the processing proceeds to the next decision step S108. It is determined at decision step S108 by the key input identifying means 103 whether or not data is entered by the key 16a. If the operator operates the key 16a in a manual fashion as represented by a YES at decision step S108, then the processing proceeds to the next step 109, whereat a delay processing of a predetermined time period, e.g., one second is executed. Thereafter, the processing proceeds to the next decision step S110, whereat it is determined by the key input identifying means 103 whether or not data is still entered by the key 16a.

If the data is entered by the key 16a as represented by a YES at decision step S110, then the processing proceeds to step S111, whereat the mode switching means 105 switches the present mode to the wireless keyboard mode by storing the identification data indicative of the wireless keyboard mode in the operation mode storage region of the RAM 13.

If on the other hand data is not entered by the key 16a as represented by a NO at decision step S110, then the apparatus enters the communication mode and the control of the CPU 11 proceeds to a program for executing a communication mode processing done by the reception control means 100.

Specifically, as is clear from the steps S108 to S111, if the operator depresses the key 16a with a small pressure, then the apparatus is placed in the communication mode. If the operator continues depressing the key 16a during a predetermined period of time, e.g., one to several seconds, then the apparatus is placed in the wireless keyboard mode.

If the data is not entered by the key 16a as represented by a NO at decision step S108, then the processing proceeds to the next decision step S112, whereat it is determined by the touch panel identifying means 104 whether or not data is entered by the touch panel 22. If data is entered by the touch panel 22 when the operator touches the touch panel 22 with a suitable input means such as a pen as represented by a YES at decision step S112, then the processing proceeds to the next decision step S113. It is determined at decision step S113 by the mode identifying means 106 whether or not data entered through the touch panel 22 indicates the mode switching.

If the data entered through the touch panel 22 indicates the mode switching as represented by a YES at decision step S113, then the processing proceeds to the next step S114, whereat the mode switching means 105 switches the present mode to the wireless keyboard mode by storing ID data indicative of the wireless keyboard mode in the operation mode storage region of the RAM 13.

If data is not entered by the touch panel 22, or data is not entered via infrared rays, the key 16a and the touch panel 22, then the processing returns to step S105. Then, the step S105 and the following steps are repeated.

Specifically, it is determined in decision steps S105, S108 and S112 whether or not the data processing means 101 receives input data. If the data processing means 101 receives data entered by infrared rays as represented by a YES at decision step S105, then the step S106 and the following steps are executed. If the data processing means 101 receives data entered by the key 16a as represented by a YES at decision step S108, then the step S109 and the following steps are executed. If the data processing means 101 receives data entered by the touch panel 22 as represented by a YES at decision step S112, then the step S112 and the following steps are executed.

Then, if the present mode is not switched to the wireless keyboard mode in step S107, S111 or S114 or if the present mode is not switched to the wireless keyboard mode as represented by a NO at decision step S113, then the processing proceeds to the next decision step S115, whereat it is determined by the mode identifying means 106 whether or not the present mode is the wireless keyboard mode. This identification is executed on the basis of ID data stored in the operation mode storage region of the RAM 13.

If the identification data is data which indicates the wireless keyboard mode as represented by a YES at decision step S115, then the processing proceeds to the next step S116, whereat the display direction indicating means 107 outputs the inverted display indicating signal. In the next step S118, the display data output means 108 outputs display data to the display control unit 14.

Therefore, the display control unit 14 effects data conversion to display the following display data in the inverted form based on the inverted display indicating signal supplied thereto from the data processing means 101. Specifically, the display control unit 14 executes a process for inverting display coordinates of display data with respect to the display coordinates of the ordinary display. Then, the display control unit 14 outputs converted display data to the display panel 21 connected to the rear stage thereof. The display panel 21 displays data output from the display control unit 14 on its picture screen. At that time, display data is displayed on the picture screen of the display panel 21 in the inverted form.

If on the other hand the present mode is not the wireless keyboard mode as represented by a NO at decision step S115, then the processing proceeds to step S117, whereat the display direction indicating means 107 outputs the ordinary display indicating signal to the display control unit 14. In the next step S118, the display data output means 108 outputs display data to the display control unit 14.

In this case, the display control unit 14 effects data conversion so as to display the following image data in the form of ordinary display and then outputs converted display data to the succeeding display panel 21. The display panel 21 displays the data output from the display control unit 14 on its picture screen. At that time, the display data displayed on the picture screen is displayed in the form of the ordinary display.

If the program end request is not received by the data processing means 101 as represented by a NO at decision step S119, then the processing returns to step S105, whereat it is determined whether or not the data processing means 101 receives infrared data or data entered by the key 16a or data entered by the touch panel 22. If the data processing means 101 receives the program end request as represented by a YES at decision step S119, this data processing program 101 is ended.

Figure 1:
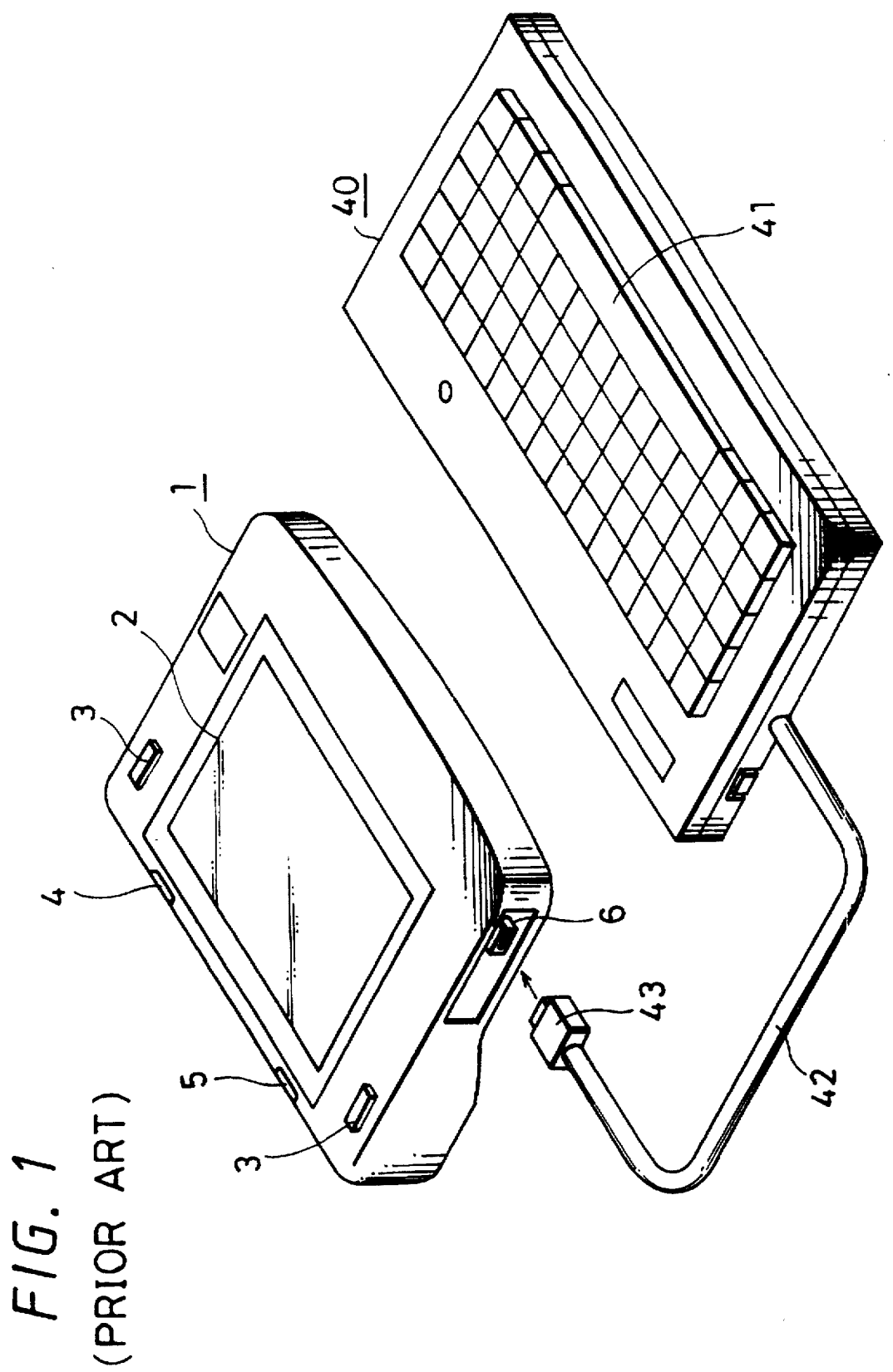
FIG. 1 is a perspective view illustrating an example of a portable data communication apparatus.
Figure 2:
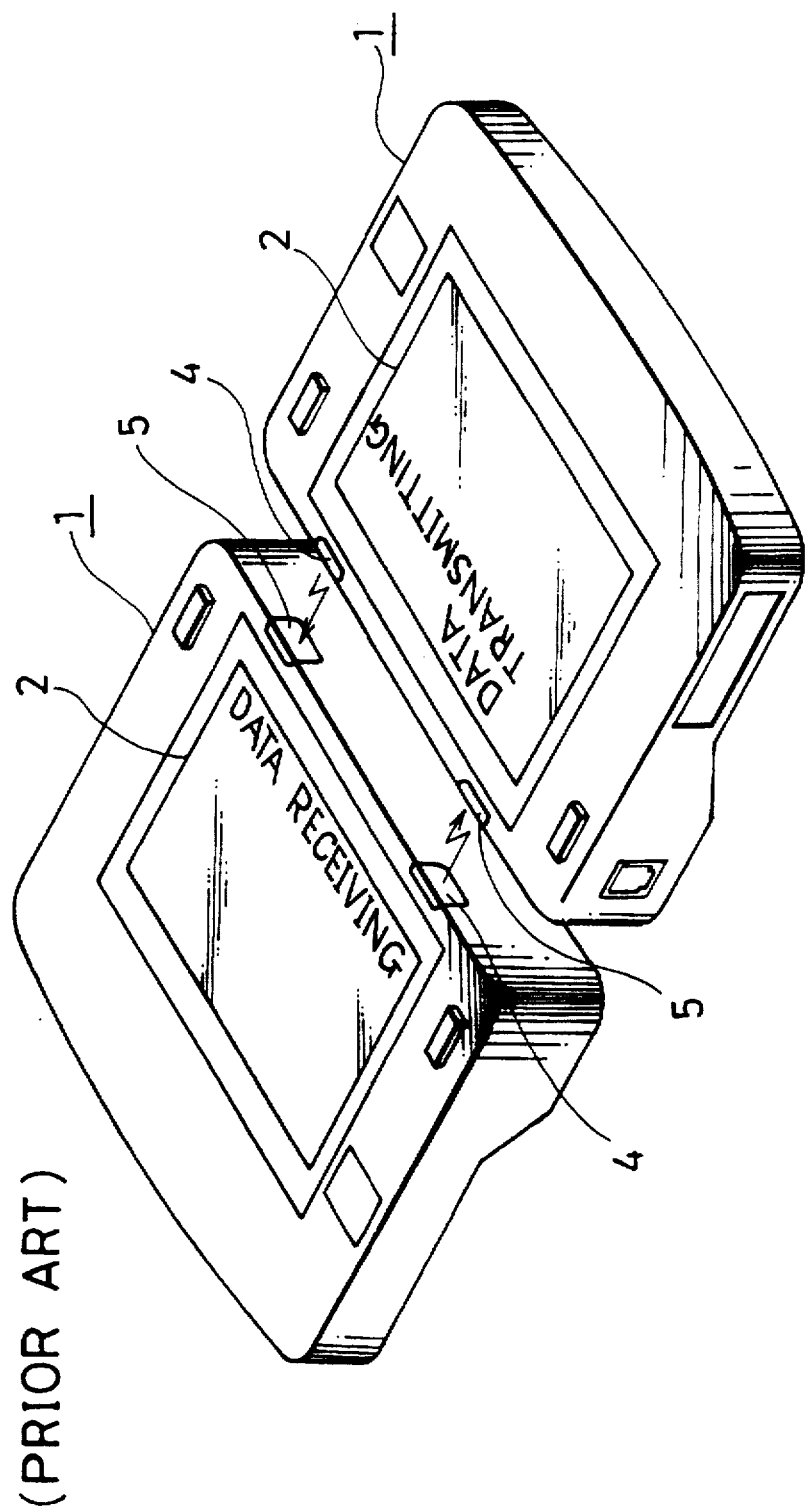
FIG. 2 is a perspective view illustrating a manner in which two portable data communication apparatus are communicating with each other.

As described above, when the wireless keyboard mode is set, display data is displayed in an inverted fashion, that is, the data is displayed as being rotated by 180° from the ordinary orientation shown in FIG. 2. Therefore, although the portable data communication apparatus includes only one infrared signal receiving unit 31, the operator can use the wireless keyboard satisfactorily. FIG. 5 is a perspective view showing a manner in which a wireless keyboard 50 is used. This wireless keyboard 50 is disposed close to (in front of) the infrared signal receiving unit 31 and the infrared signal emitting unit 32 both of which are disposed on the upper side of the portable data communication apparatus 10. Accordingly, the user operating the wireless keyboard 50 watches the portable data communication apparatus 10 in an inverted fashion. However, if the wireless keyboard mode using the wireless keyboard 50 is set, then the displayed state on the display panel 20 also is inverted (displayed state in FIG. 5) so that the user can watch displayed data on the display panel 20 in a usual manner. When the operator operates various keys 51 disposed on the wireless keyboard 50, the infrared signal output from the infrared signal emitting unit 52 of the wireless keyboard 50 is received by the infrared signal receiving unit 31 disposed close to the infrared signal receiving unit 52. Therefore, the user can operate the portable data communication apparatus 10 with the wireless keyboard 50 satisfactorily.

When a communication between the portable data communication apparatus 10 and other portable data communication apparatus is made via an infrared signal, the reception control unit 11a switches the present mode to the communication mode. Thereafter, similarly to FIG. 2, under the condition that the infrared signal receiving unit 31 and the infrared signal emitting unit 32 disposed on the upper side of the portable data communication apparatus 10 are made close to an infrared signal emitting unit and an infrared signal receiving unit of another portable data communication apparatus, the user can operate the portable data communication apparatus satisfactorily. In this case, character data or graphics data are displayed in the ordinary fashion where the side on which the infrared signal receiving unit 31 and the infrared signal emitting unit 32 are disposed is oriented as the upper side.

The reception control unit 11a can automatically switch the present mode to the communication mode as follows. That is, ID (identification) data of the infrared signal transmitted from other portable data communication apparatus may be read similarly when the wireless keyboard mode is set. Then, the present mode may be automatically switched to the communication mode.

Further, when display data is displayed on the picture screen of the display panel 21 by operating the touch panel 22, display data is displayed in the ordinary form. Hence, the portable data communication apparatus 10 can be used in the ordinary state where the infrared signal receiving unit 31 and the infrared signal emitting unit 32 are oriented to the upper side of the portable data communication apparatus 10.

Therefore, according to the portable data communication apparatus of the present invention, when the wireless keyboard is used, the infrared signal receiving unit is oriented to that side. Further, when the portable data communication apparatus communicates with other external device via an infrared signal, the infrared signal receiving unit and the infrared signal emitting unit can be oriented to the upper side. Therefore, the portable data communication apparatus with one infrared signal receiving unit can communicate with other external device and receive data from the wireless keyboard. Further, since the portable data communication apparatus needs only one infrared signal receiving unit, external devices that can use the wireless keyboard can be miniaturized.

While the present invention is applied to the display portion of a portable data communication apparatus called PDA, a principle of the present invention can also be applied to a wide variety of data display apparatus.

While data is transmitted via infrared signal as described above, the present invention is not limited thereto and data may be transmitted by other communication systems.

According to the present invention, when the first mode for receiving data transmitted from the keyboard is set, display data is displayed on the picture screen of the display panel under the condition that the direction in which the external input means is disposed is taken as the lower side. Thus, the user can operate the keyboard disposed in front of the portable data communication apparatus. Further, when a mode other than the mode which does not use the keyboard is set, display data is displayed on the picture screen of the display panel in the other direction. Thus, the portable data communication apparatus can transmit and receive data between it and other portable data communication apparatus under the condition that the receiving means is oriented to the upper side. Therefore, a portable data communication apparatus having a simple arrangement using only one receiving means can be operated by the wireless keyboard and can communicate with other portable data communication apparatus.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A portable data communication apparatus comprising:

data receiving means adapted to receive data transmitted from an external source;

data processing means for processing said data;

reception control means for supplying said data received by said data receiving means to said data processing means;

a display for displaying said data processed by said data processing means, said display including a housing and a display panel; and display control means for controlling said display of data processed by said data processing means;

a display for displaying said data under control of said display control;

data receiving means adapted to receive external data; and reception control means for supplying said data received by said data receiving means to said data processing means, wherein said display control means controls said display such that when said data receiving means is receiving data, said display displays said data in a first orientation, and when said data receiving means is not receiving data, said display displays said data in a second orientation inverted or rotated by substantially 180 degrees with respect to said first orientation, and said data receiving means is arranged on said housing close to a bottom edge of said display panel when said data is displayed in said first orientation.

2. A portable data communication apparatus comprising:

data receiving means adapted to receive data from an external source;

data processing means for processing said data;

reception control means for supplying said data received by said data receiving means to said data processing means;

a display for displaying said data processed by said data processing means, said display including a housing and a display panel; and display control means for controlling said display such that said display selectively displays said data in a first orientation or a second orientation inverted or rotated by substantially 180 degrees with respect to said first orientation, wherein when said reception control means is set to a first mode in which said data receiving means is receiving data, said display control means controls said display such that said data is displayed in said first orientation, and said data receiving means is arranged on said housing close to a bottom edge of said display panel when said data is displayed in said first orientation.

3. A portable data communication apparatus according to claim 2, wherein when said reception control means is set to a mode other than said first mode, said display control means controls said display such that said data is displayed in said second orientation.

4. A portable data communication apparatus according to claim 3, wherein when said reception control means is set to said mode other than said first mode, if said data receiving means receives a predetermined signal, said reception control means switches to said first mode.

5. A data communication system comprising:

a portable data communication apparatus including data receiving means for receiving data, data processing means for processing said data, reception control means for supplying said data received by said data receiving means to said data processing means, a display for displaying said data processed by said data processing means, and display control means for controlling said display such that said data is displayed in a first orientation or a second orientation inverted or rotated by substantially 180 degrees with respect to said first orientation; and an external input device for supplying said data to said data receiving means, wherein said display control means controls said display such that when said data receiving means is receiving said data from said external input device, said display control means controls said display such that said data is displayed in said first orientation, and when said data receiving means is not receiving said data from said external input device, said data is displayed in said second orientation.

6. A data communication method comprising the steps of:

receiving data supplied from an external input device using a data receiver;

performing data processing on said data received by said data receiver to form processed data;

supplying said processed data to a display controller; and controlling a display orientation using said display controller such that said processed data is normally displayed in a first orientation, and when said data receiver receives said data supplied thereto from said external input device, said display controller controls said display such that said data is displayed in a second orientation inverted or rotated by substantially 180 degrees with respect to said first orientation.

7. A data communication method according to claim 6, further comprising the step of controlling said display to switch from said first orientation to said second orientation when said data receiver receives a predetermined signal.

* * * * *